United States Patent [19]

Byrne

[11] 4,065,281

[45] Dec. 27, 1977

[54] PRODUCTION OF AMBER GLASS

[75] Inventor: Robert Edward Byrne, Martinsville, N.J.

[73] Assignee: Research-Cottrell, Bound Brook, N.J.

[21] Appl. No.: 683,328

[22] Filed: May 5, 1976

[51] Int. Cl.$^2$ .......................... C03B 5/16; C03C 13/00
[52] U.S. Cl. ............................................. 65/19; 65/27; 65/134; 106/51; 106/52; 106/DIG. 1
[58] Field of Search ...................... 65/33, 27, 134, 19; 106/DIG. 1, 52, 51

[56] References Cited

U.S. PATENT DOCUMENTS

| | | | |
|---|---|---|---|
| 1,724,747 | 8/1929 | Cochius | 106/52 |
| 2,987,411 | 6/1961 | Minnick | 106/DIG. 1 |
| 3,150,991 | 9/1964 | Monks, Jr. | 65/134 X |
| 3,573,940 | 4/1971 | Cockrell et al. | 106/DIG. 1 |
| 3,627,548 | 12/1971 | Hammer et al. | 65/134 X |
| 3,830,639 | 8/1974 | Evans et al. | 65/19 |
| 3,867,158 | 2/1975 | Hopkins | 106/52 X |
| 3,928,047 | 12/1975 | Kapolyi et al. | 65/33 |
| 3,962,080 | 6/1976 | Dolin et al. | 106/DIG. 1 |
| 3,969,122 | 7/1976 | Miller | 106/52 |

FOREIGN PATENT DOCUMENTS

| | | | |
|---|---|---|---|
| 4,638,972 | 4/1963 | Japan | 106/DIG. 1 |
| 53,574 | 6/1967 | Poland | 106/DIG. 1 |

Primary Examiner—S. Leon Bashore
Assistant Examiner—Frank W. Miga
Attorney, Agent, or Firm—Harold L. Stowell

[57] ABSTRACT

Amber glass is made by melting a soda-lime glass-forming batch in which at least 1 percent of the silica content is provided by lignite fly ash.

1 Claim, No Drawings

PRODUCTION OF AMBER GLASS

BACKGROUND OF THE INVENTION

1. Field of the Invention

This invention relates to a novel method of making amber soda-lime glass useful in the production of bottles and other containers and to the amber glass made thereby.

2. Description of the Prior Art

Typical present-day methods of making glass are described in Encyclopedia of Chemical Technology by Kirk-Othmer, (2nd Edition) Volume 10, (1966) at pages 549–557.

The usual raw materials for the production of amber glass are silica (sand), soda ash, limestone or dolomite, feldspar and iron oxide. A representative batch composition in pounds is:

Sand: 22.8
Soda Ash: 8.0
Potassium Carbonate: 2.3
Sodium Nitrate: 2.1
Lime: 3.0
Feldspar: 1.6
Borax: 0.5
Antimony: 0.1 plus iron oxide $Fe_2O_3$ to the desired color.

The method of the invention may be defined as comprising a method of producing amber soda-lime glass by a fusion process of Sand: 22.8
Soda Ash: 8.0
Potassium Carbonate: 2.3
Sodium Nitrate: 2.1
Lime: 3.0
Feldspar: 1.6
Borax: 0.5
Antimony: 0.1 plus iron oxide $Fe_2O_3$ to the desired color, the improvement comprising substituting at least 1 percent of the silica content of the sand, lime and feldspar of the batch with lignite fly ash.

SUMMARY OF THE INVENTION

I have found that all or a substantial portion of the silica content of the batch can be supplied by lignite coal, whereby much of the sand, lime and feldspar of the glass batch can be omitted thereby effecting a very substantial saving in raw material cost, for the reason that lignite fly ash is now a by-product of no commercial value but one that must be disposed of at a substantial expense.

DESCRIPTION OF THE PREFERRED EMBODIMENTS

In general, the glass-forming batch of the invention may comprise from one to seventy percent of lignite fly ash with raw material savings approximately proportionate to the proportion of the fly ash used in the batch.

A representative analysis of fly ash from the combustion of lignite coal is:

| Constituent | % |
| --- | --- |
| $SiO_2$ | 53.0 |
| $CaO$ | 17.4 |
| $MgO$ | 5.8 |
| $Al_2O_3$ | 15.4 |
| $Fe_2O_3$ | 4.4 |
| $TiO_2$ | 2.2 |
| $SO_3$ | 0.9 |
| $P_2O_5$ | 0.2 |
| $Na_2O$ | 0.1 |
| $K_2O$ | 0.1 |

When such a fly ash is substituted for all of the lime and feldspar and part of the sand in the representative batch formula given above, a batch of the following formula in pounds is provided:

Fly Ash: 20.0
Sand: 9.0
Soda Ash: 7.0
Potassium Carbonate: 2.0
Sodium Nitrate: 1.7
Borax: 0.5
Antimony: 0.1

This batch composition was made into glass following typical glass making methods as described in the Encyclopedia of Chemical Technology supra.

This batch composition made a glass comparable in color and quality with the glass made from the representative batch formula previously set forth and resulted in the saving of all of the lime and feldspar and 60 percent of the sand.

I claim:

1. A method of producing amber soda-lime glass by a fusion process of

Sand: 22.8
Soda Ash: 8.0
Potassium Carbonate: 2.3
Sodium Nitrate: 2.1
Lime: 3.0
Feldspar: 1.6
Borax: 0.5
Antimony: 0.1 plus iron oxide $Fe_2O_3$ to the desired color, the improvement comprising substituting at least one percent of the silica content of the sand, lime and feldspar of the batch with lignite fly ash.

* * * * *